US010994855B2

(12) United States Patent
Johns et al.

(10) Patent No.: US 10,994,855 B2
(45) Date of Patent: May 4, 2021

(54) INDUCTIVE INTERFACE FOR MODULAR COMPONENTS

(71) Applicant: Bell Helicopter Textron Inc., Fort Worth, TX (US)

(72) Inventors: William Benjamin Johns, Little Elm, TX (US); Jason William Minter, Benbrook, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 195 days.

(21) Appl. No.: 16/399,537

(22) Filed: Apr. 30, 2019

(65) Prior Publication Data

US 2020/0346778 A1    Nov. 5, 2020

(51) Int. Cl.
| | | |
|---|---|---|
| *B64D 31/14* | (2006.01) |
| *B64C 29/02* | (2006.01) |
| *H02J 50/10* | (2016.01) |
| *B64C 39/02* | (2006.01) |

(52) U.S. Cl.
CPC .............. *B64D 31/14* (2013.01); *B64C 29/02* (2013.01); *B64C 39/024* (2013.01); *H02J 50/10* (2016.02); *B64C 2201/027* (2013.01); *B64C 2201/042* (2013.01); *B64C 2201/06* (2013.01); *B64D 2221/00* (2013.01)

(58) Field of Classification Search
CPC .... B64D 31/14; B64D 2221/00; B64D 45/00; B64D 27/24; B64C 29/02; B64C 39/024; B64C 2201/06; B64C 2201/027; B64C 2201/042; H02J 50/10; H02J 2310/44
See application file for complete search history.

(56) References Cited

U.S. PATENT DOCUMENTS

| | | | | |
|---|---|---|---|---|
| 2010/0231163 A1* | 9/2010 | Mashinsky | ............. | H02J 50/12 320/108 |
| 2018/0072414 A1* | 3/2018 | Cantrell | ................. | B64C 33/02 |
| 2019/0308514 A1* | 10/2019 | Parimi | .................... | H02J 50/12 |

OTHER PUBLICATIONS

Wireless Power Consortium, "Introduction to the Power Class 0 Specification," Version 1.2.3., Feb. 2017, 16 pages.
Wireless Power Consortium, "The Qi Wireless Power Transfer System Power Class 0 Specification," Part 4: Reference Designs, Version 1.2.3., Feb. 2017, 336 pages.
Wireless Power Consortium, "The Qi Wireless Power Transfer System Power Class 0 Specification," Parts 1 and 2: Interface Definitions, Version 1.2.3., Feb. 2017, 165 pages.

(Continued)

*Primary Examiner* — Rodney A Butler
(74) *Attorney, Agent, or Firm* — Patent Capital Group

(57) ABSTRACT

In some examples, an aircraft comprises a motorized module. The motorized module comprises a motor and a first coil. The motor is to operate equipment onboard the aircraft and generates vibrations during operation. The first coil is operable to wirelessly transmit power to a separate module onboard the aircraft based on electromagnetic induction between the first coil and a second coil in a separate module, and wirelessly transfer data with the separate module via the second coil based on the electromagnetic induction, the data being associated with the motor. A gap separates the motorized module and the separate module. The gap isolates the separate module from the vibrations.

20 Claims, 8 Drawing Sheets

(56) References Cited

OTHER PUBLICATIONS

Wu, Jiande, Chongwen Zhao, Zhengyu Lin, Jin Du, Yihua Hu, and Xiangning He, "Wireless Power and Data Transfer via a Common Inductive Link Using Frequency Division Multiplexing," IEEE Transactions on Industrial Electronics 62, No. 12 (2015), 10 pages; http://publications.aston.ac.uk/27371/1/Wireless_power_and_data_transfer.pdf.

* cited by examiner

INDUCTIVE INTERFACE FOR MODULAR COMPONENTS

TECHNICAL FIELD

This disclosure relates generally to aircraft and, more particularly, to an aircraft having inductive interfaces for transmitting data between modular components.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller. The fact that such aircraft are required to perform such a variety tasks and in potentially different environment makes it important that their control systems are easily adaptable to a specific application.

SUMMARY

In some examples, an aircraft comprises a motorized module. The motorized module comprises a motor and a first coil. The motor is to operate equipment onboard the aircraft and generates vibrations during operation. The first coil is operable to wirelessly transmit power to a separate module onboard the aircraft based on electromagnetic induction between the first coil and a second coil in a separate module, and wirelessly transfer data with the separate module via the second coil based on the electromagnetic induction, the data being associated with the motor. A gap separates the motorized module and the separate module. The gap isolates the separate module from the vibrations.

In other examples, an aircraft comprises a controller module comprising a first coil and a processor. The first coil is operable to wirelessly receive power from a second coil in a separate module onboard the aircraft based on electromagnetic induction between the first coil and the second coil, and wirelessly transfer data with the separate module via the second coil based on the electromagnetic induction, the data being associated with a component in the separate module. The processor is operable to: receive the power via the first coil, and receive the data from the separate module via the first coil. A gap separates the controller module and the separate module. The gap isolates the controller module from vibrations generated by the component in the separate module.

In further examples, an aircraft comprises a motorized module, a controller module, and a gap separating the motorized module and the controller module. The motorized module comprises a motor and a first coil. The motor is to operate equipment onboard the aircraft. The first coil is operably coupled to the motor. The motor generates vibrations during operation. The controller module comprises a second coil and a processor. The processor is operable to process data received via the second coil. The gap isolates the controller module from the vibrations generated by the motor in the motorized module. Based on electromagnetic induction between the first coil and the second coil, the first coil and the second coil are operable to: wirelessly transmit power from the motorized module to the controller module, and wirelessly transfer the data between the motorized module and the controller module based on the electromagnetic induction.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
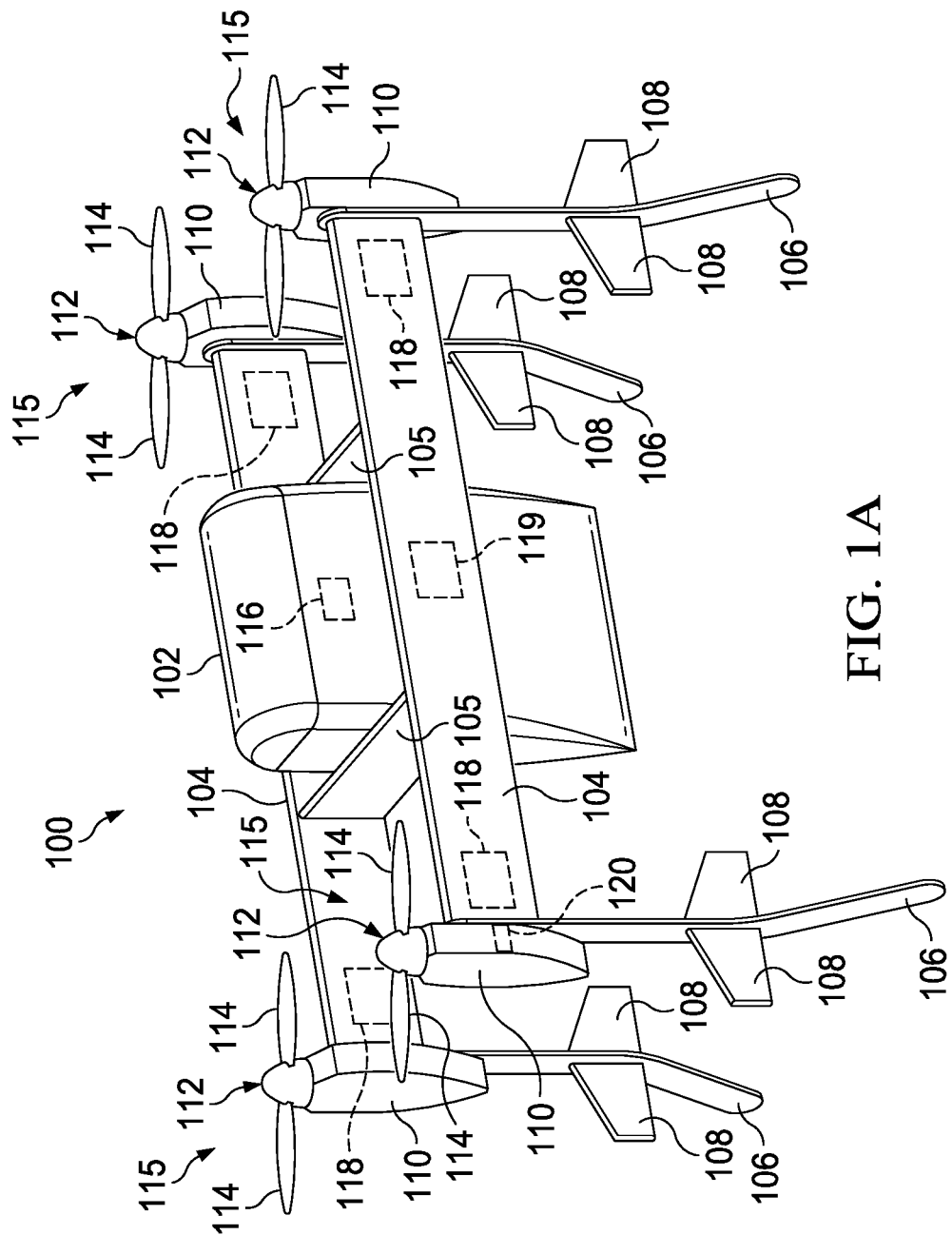
FIG. 1A is an oblique view of an aircraft configured for operation in a helicopter flight mode, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of-an aircraft relative to another component or component aspect(s). The term "inboard" may refer to a location of a component that is within the fuselage of an aircraft and/or a spatial direction that is closer to or along a centerline of the aircraft relative to another component or component aspect (s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying Figures.

Autonomous unmanned aircraft (or "UAVs") have capabilities that render them suitable for myriad applications including, e.g., carrying and/or delivering a package or other payload, aerial photography, reconnaissance (e.g., in military or civilian applications), and others. The fact that such aircraft are required to perform a variety tasks and in potentially different environments makes it important that their control systems are easily adaptable to a specific application. Some components of a UAV are modular to facilitate interchanging such components to suit the specific application. Different modular components, e.g., each serving a different function, may be selectively added and/or removed from a UAV. In some cases, a single modular component may be used, at different times, on multiple different UAVs. The interchangeability of such modular components on UAVs relies on a common interface between the modular components and/or between the modular components and the UAVs. An interface between modular components and/or between modular components and UAVs enables different modular components to operate interchangeably with one another on a UAV.

An interface may include two connectors such as a male connector and a female connector, that when correctly coupled, establish electrical communication to facilitate the transmission of both power and/or data between the connectors of the interface. Each connector includes an electrically conductive part such as a pin or a contact over which electrical signals are transmitted between the connectors.

It may be challenging to utilize an interface for power and data between modular components of a UAV due to issues of design and reliability of connectors in the interface. For example, some interfaces have strict tolerances to facilitate aligning traditional electrical connections. If, for example, one of the connectors is out of tolerance, additional machining operations may be required during manufacture and/or precise alignment may be required during assembly. In the latter case, the connectors may henceforth be prone to misalign during operation of the UAV. In addition, connectors that rely on mechanical interactions such as physical interlocking and/or spring loaded connections can endure only a finite number of mating cycles beyond which the quality of the electrical connections can degrade or fail. Any connectors that are exposed to an environment may be subjected to moisture, debris, or other contaminants in the environment, which can degrade performance if introduced into the connectors. Some interfaces include connectors that rely on springs ("spring-loaded" connectors) to help maintain contact between the electrically conductive parts on paired connectors. However, spring-loaded connectors can be negatively affected by vibrations experienced during operation of the UAV. For example, spring-loaded connectors may spontaneously decouple from one another if subjected to vibrations at or near a resonant frequency of the spring. Such spring-loaded connectors become unpaired and unable to transmit power and/o data when the UAV operates at the resonance of the spring. In addition, some modular components include motors which produce vibrations that may negatively affect other modular components. When such modular components are directly coupled to one another, the vibrations of one modular component can degrade the operation of the other.

A solution to the above-described challenges, as well as others, presented in the present disclosure includes an electromagnetic induction interface for transfer of power and data. Advantageously, such an interface can establish non-contacting electrical communication over an air gap between elements of the interface. The inductive interfaces do not require direct physical contact, which could negatively impact some components and/or other traditional connectors. Each element of the interface may include a coil for electromagnetic inductive transmission of power and/or data between elements of the interface. Because the interface can operate in the presence of a gap between interface surfaces, the interface can operate with very loose tolerances of the interface surfaces and in high vibration contexts. In addition, because the coils can communicate through a sealed housing, the internal components may be sealed, unexposed and, therefore, resistant to environmental contaminants.

Figure 1B:
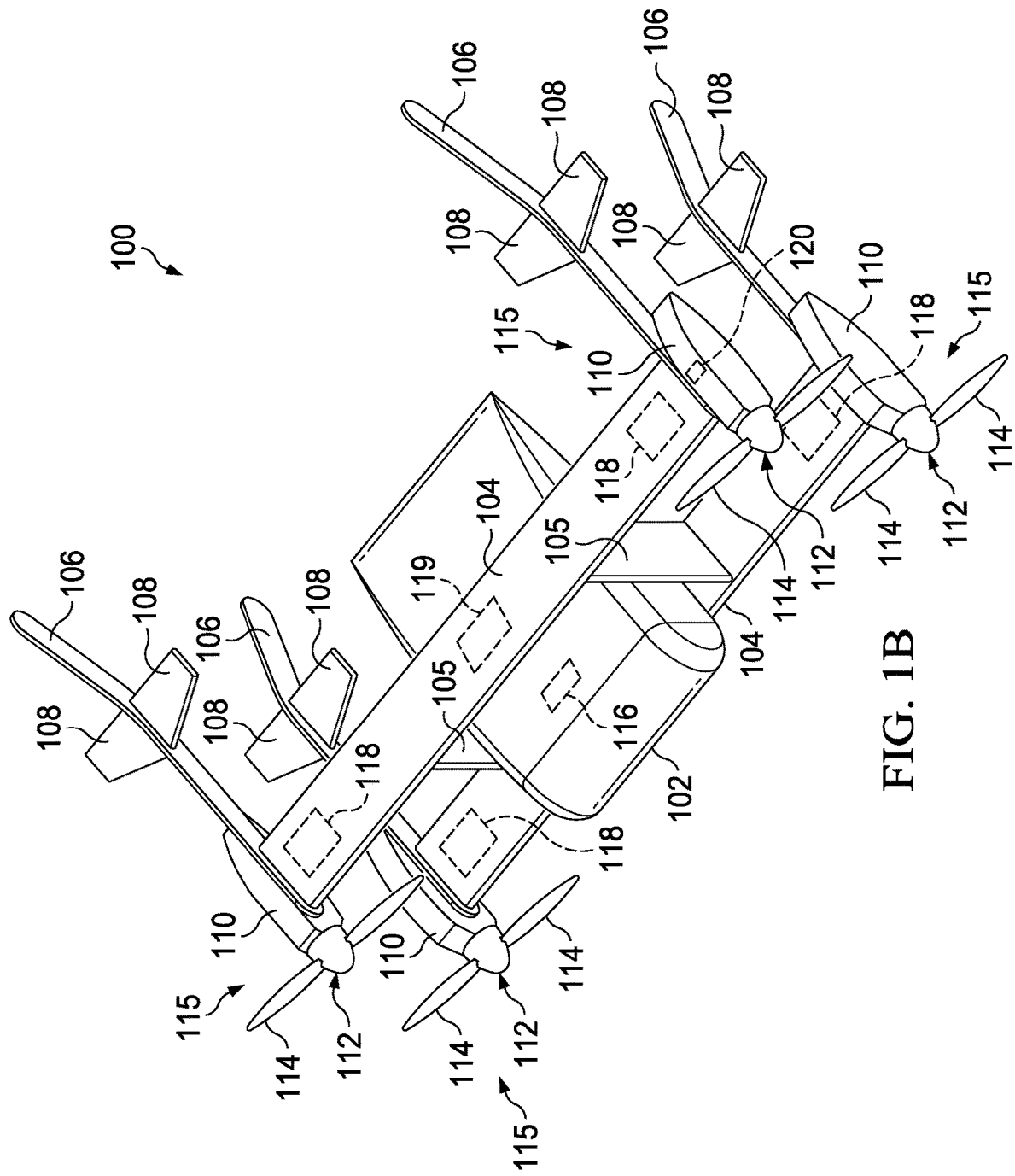
FIG. 1B is an oblique view of the aircraft of FIG. 1A configured for operation in an airplane flight mode, in accordance with some embodiments of the present disclosure.

Referring now to FIGS. 1A and 1B, oblique views of an aircraft 100 are shown, in accordance with some embodiments of the present disclosure. Aircraft 100 is generally configured as a vertical takeoff and landing ("VTOL") aircraft, more specifically an autonomous pod transport ("APT") convertible drone aircraft, that is operable in a helicopter mode (shown in FIG. 1A) associated with vertical takeoff from and landing to a landing zone, hover, and sideward and rearward mobility or flight, and an airplane mode (shown in FIG. 1B) associated with forward flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully made autonomous and self-directed via a predetermined or preprogrammed location-based guidance system (e.g., global positioning system ("GPS"), coordinate-based location, street address, etc.).

Aircraft 100 comprises a cargo pod 102 that may function as the aircraft fuselage, biplane wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. The propulsion assembly 115 is an example of a motorized module. Aircraft 100 also comprises a payload sensor 116, a plurality of aircraft sensors 118, an orientation sensor 119, and a controller module 120. The controller module 120 is configured to control operation of the propulsion assemblies 115 and/or other electronic systems of aircraft 100. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor. However, in other embodiments, the rotor systems 112 may be driven by a combustion engines or auxiliary power unit through a plurality of interconnect driveshafts and/or auxiliary gearboxes. Furthermore, since aircraft 100 functions as a convertible aircraft, the rotational speeds of each rotor system 112 may be selectively controlled to orient aircraft 100 in the various flight modes.

Figure 2:
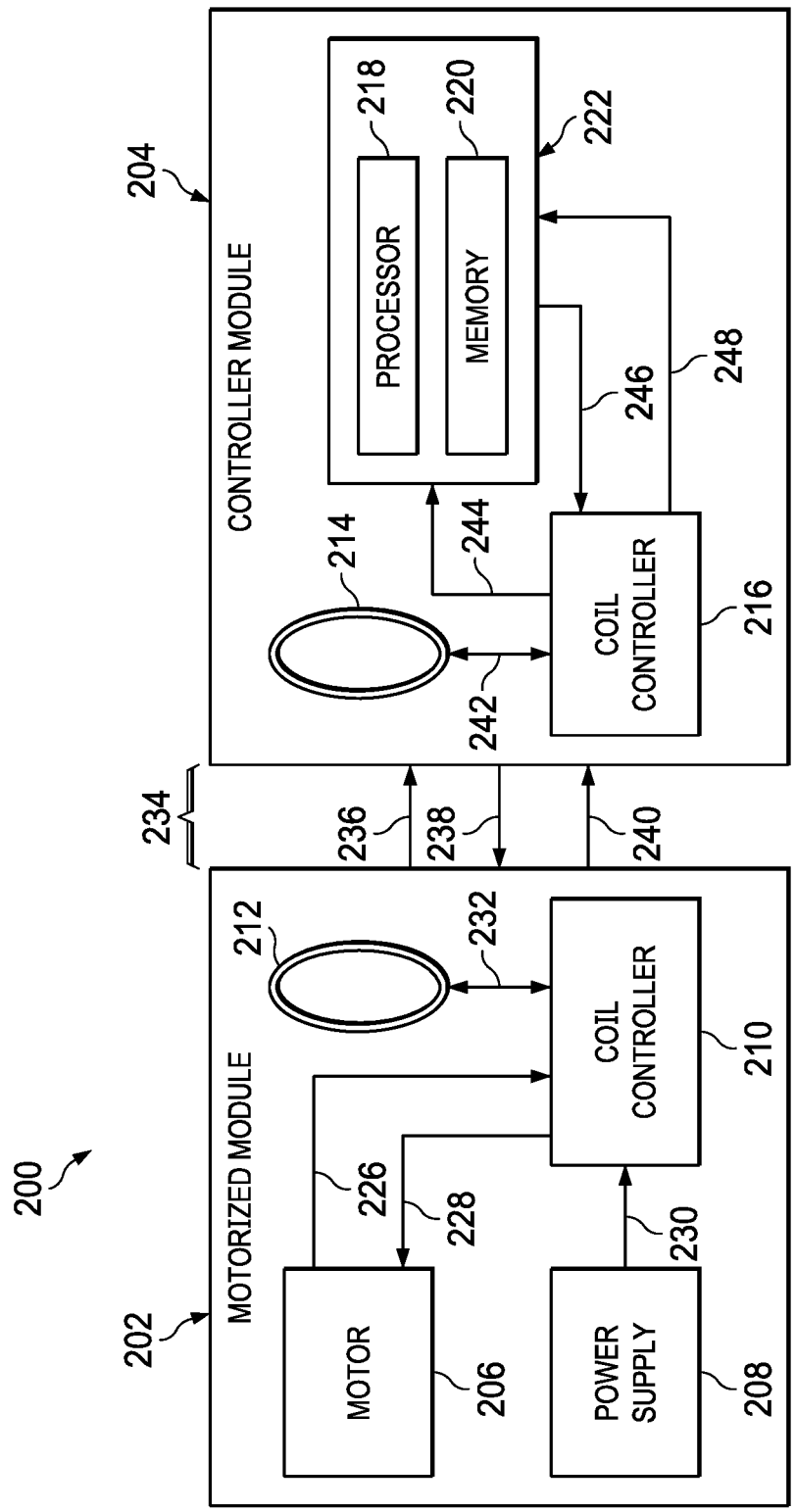
FIGS. 2 and 3 are simplified component diagrams of systems for wireless data and/or power transmission between modular components of an aircraft, in accordance with some embodiments of the present disclosure.

FIG. 2 illustrates a system 200 for wireless data and power transfer between modular components of an aircraft such as the aircraft 100 or others. The system 200 includes a motorized module 202 and a controller module 204, which are configured to wirelessly transfer data and power between one another based on resonant inductive coupling between electromagnetic coils. The motorized module 202 wirelessly transmits telemetry data 236 to the controller module 204. The controller module 204 wirelessly transmits control instructions 238 to the motorized module 202. The motorized module 202 wirelessly transmits power 240 to the controller module 204. The data (e.g., 236 and/or 238) and the power 240 may be multiplexed during transmission between the motorized module 202 and the controller module 204. Telemetry data is inclusive of data that describes, indicates, or otherwise monitors the performance and/or operatorial status of aircraft equipment. The telemetry data may be received directly from the aircraft equipment and/or may be measured by sensors associated with the aircraft equipment. For example, the telemetry data may include data identifying: a voltage of a battery pack, a rotational speed (e.g., measured in revolutions per minute (RPM)) of a motor, a temperature of a component (such as a motor, an Electronic Speed Controller (ESC), and/or a servo), readings from sensors associated with a component, an electric current being drawn by a component, a position of a servo, an error associated with a servo, or combinations thereof.

The motorized module 202 includes a motor 206, a power supply 208, a coil controller 210, an electromagnetic coil 212, and channels 226, 228, 230, and 232. Each of the channels 226, 228, 230, and 232 may include one or more wires. The power supply 208 delivers power to the coil controller 210 through channel 230. The motor 206 drives operation of equipment onboard the aircraft. In some examples, the motor 206 is responsible for operating equipment onboard an aircraft such as propulsion assemblies, control assemblies including control surfaces, other components of the motorized module 202, other components of the controller module 204, and/or or other components that rely on receiving torque from the motor 206. The motor 206 may draw power from the power supply 208 or from another source. The channel 232 couples the electromagnetic coil 212 and the coil controller 210 and is operable to bidirectionally transmit data and power between the two. Channels 226 and 228 facilitate transfer of data between the motor 206 and the coil controller 210. The channel 226 can deliver telemetry data from the motor 206 to the coil controller 210. The channel 228 can deliver control instructions from the coil controller 210 to the motor 206. The control instructions may be executed by the motor 206 and/or may be utilized to drive operation of the motor 206 (e.g., executed by another component, which controls the motor). In some examples, the control instructions include a plurality of control instructions where one or more are for execution by different components of the system 200. The coil controller 210 controls the electromagnetic coil 212 to facilitate the transfer of power and/or data with the controller module 204. The coil controller 210 can wirelessly transmit the power 240 and the telemetry data 236 to the controller module 204 and can wirelessly receive the control instructions 238 from the controller module 204 via the electromagnetic coil 212.

The controller module 204 includes a processing unit 222, a coil controller 216, an electromagnetic coil 214, and channels 242, 244, 246, and 248. Each of the channels 242, 244, 246, and 248 may include one or more wires. The channel 242 couples the electromagnetic coil 214 and the coil controller 216 and bidirectionally transmits data and power between the two. The coil controller 216 delivers power to the processing unit 222 through channel 244. The processing unit 222 includes a processor 218 and a memory 220 operably coupled to one another. The processor 218 and the memory 220 receive power via the channel 244. The processor 218 processes data, which may include executing one or more functions on the data. For example, the processor 218 may process the telemetry data 236 from the motorized module 202 to determine control instructions for updating the operating characteristics of the motor 206. The telemetry data may include data from sensors associated with the motor 206. In some examples, the motor 206 is responsible for operating equipment onboard an aircraft. The control instructions may be used directly or indirectly to control such equipment on the motorized. In some examples, the control instruction when executed by the motor 206 control the speed, and/or direction of the aircraft on which the system 200 is located. The memory 220 may store data received from the coil controller 216 and/or data that has been processed by the processor.

The motorized module 202 generates vibrations during operation. However, the processing unit 222 of the controller module 204 is sensitive to the vibrations. For example, a performance of the processing unit 222 decreases based on the vibrations from the motor 206 reaching the processing unit 222. The motorized module 202 may generate such vibrations from two sources of electrical noise. A first source of the vibrations may include a Switch-Mode Power Supply (SMPS), which regulates a battery input voltage down to a voltage required for other systems within the motorized module 202 (e.g., a servomotor, ESC compute power, and the like). A frequency of the vibrations from the first source can range from a few kilohertz to many megahertz dependent on the topology of the SMPS and the demand of the load it is driving. A second source of the vibrations may include a combination of the motor 202 and an ESC, which controls the speed of the motor 206. The vibrations, from the second source, are generated as a result of the battery input voltage being switched into phased inputs of the motor 202 via the ESC. A frequency of the vibrations from the second source can vary in relation to the speed of the motor 202 (e.g., measured in electrical RPM) multiplied by the pole-pairs of the motor 202. Advantageously, an air gap 234 separates the motorized module 202 and the controller module 204 to isolate the processing unit 222 from the vibrations of the motor 206. The air gap 234 inhibits the vibrations from passing from the motor 206 to the processing unit 222 while the motorized module 202 and the controller module 204 wireless transfer power and/or data.

In some examples, the air gap 234 range from about 0 to 1.5 inches within which the motorized module 202 and the controller module 204 can wirelessly transfer power and/or data. In further examples, a first housing encloses at least a portion of the motorized module 202 and a second housing encloses at least a portion of the controller module 204. In such examples, the air gap 234 is measured between the first housing and the second housing.

During operation of the system 200, the motorized module 202 transmits the power 240 to the controller module 204. The coil controller 210 receives the power from the power supply 208 through the channel 230. The coil controller 210 transmits the power to the electromagnetic coil 212 through channel 232. The coil controller 210 utilizes the power to generate, using the electromagnetic coil 212, a time-varying electromagnetic field for transmitting the power 240 to the electromagnetic coil 214. The electromagnetic coil 214 receives the time-varying electromagnetic field. The coil controller 216 extracts the power 240 from the electromagnetic field via the electromagnetic coil 214 and receives it through the channel 242. The coil controller 216 may supply at least a portion of the power to the processing unit 222 through the channel 244.

In addition, during operation of the system 200, the motorized module 202 and the controller module 204 bidirectionally transfer data between one another. The data include at least the telemetry data 236 and the control instructions 238. The telemetry data 236 is transmitted from the motor 206 to the coil controller 210 via the channel 226. The coil controller 210 transmits the telemetry data to the electromagnetic coil 212 through channel 232. The coil controller 210 generates, using the electromagnetic coil 212, a time-varying electromagnetic field for transmitting the telemetry data 236 to the electromagnetic coil 214. For example, the coil controller 210 modulates an electric current to encode the telemetry data in the electromagnetic field. The electromagnetic coil 214 receives the time-varying electromagnetic field and supplies it to the coil controller 216 through the channel 242. The coil controller 216 extracts the telemetry data 236 from the electromagnetic field. For example, the coil controller 216 demodulates the electromagnetic field to decode the telemetry data. The coil controller 216 may transmit at least a portion of the telemetry data 236 to the processing unit 222 via the channel 248. The processing unit 222 may process the telemetry data 236.

The control instructions 238 may be generated by the processor 218. In some examples, the control instructions are generated based on the telemetry data from the motor 206, telemetry data from other aircraft equipment, sensor data from one or more sensors, and/or other data. The control instructions may be stored in the memory 220. The control instructions are transmitted from the processing unit 222 to the coil controller 216 via the channel 246. The coil controller 216 transmits the control instructions to the electromagnetic coil 214, through the channel 242. The coil controller 216 generates, using the electromagnetic coil 214, a time-varying electromagnetic field for transmitting the control instructions 238 to the electromagnetic coil 212. For example, the coil controller 216 modulates an electric current to encode the control instructions 238 in the electromagnetic field. The electromagnetic coil 212 receives the time-varying electromagnetic field and supplies it to the coil controller 210 through the channel 232. The coil controller 210 extracts the control instructions 238 from the electromagnetic field. For example, the coil controller 210 demodulates the electromagnetic field to decode the control instructions. The coil controller 210 transmits the control instructions to the motor 206 through the channel 228.

In some examples, each of the modules 202 and 204 comply with a standard published by a standards organization or technology consortium. For example, the Wireless Power Consortium published "The Qi Wireless Power Transfer System," version 1.2.3, in February 2017 (i.e., the "Qi Interface Standard"). The Qi Interface Standard defines wireless power transfer using inductive charging. In some examples, each of the modules 202 and 204 comply with and/or implement the Qi Interface Standard.

Figure 3:
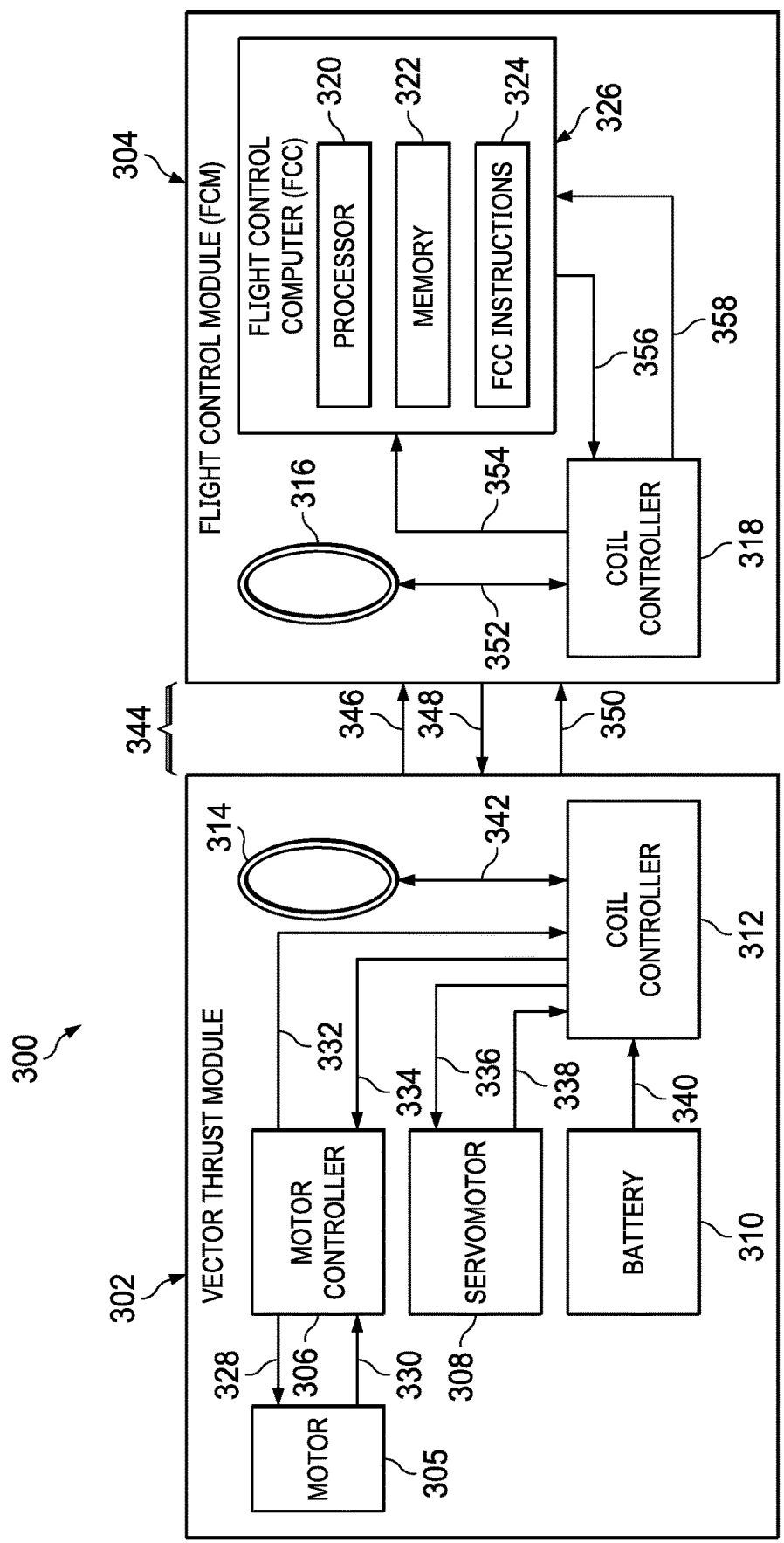

FIG. 3 illustrates a system 300 for wireless data and power transfer between modular components of an aircraft such as the aircraft 100 or others. The system 300 includes a vector thrust module 302 and a flight control module 304, which are configured to wirelessly transfer data and power between one another based on resonant inductive coupling between electromagnetic coils. The vector thrust module 302 wirelessly transmits telemetry data 346 to the flight control module 304. The flight control module 304 wirelessly transmits control instructions 348 to the vector thrust module 302. The vector thrust module 302 wirelessly transmits power 350 to the flight control module 304. The data (e.g., 346 and/or 348) and the power (e.g., 350) may be multiplexed during transmission. The system 300 is an example of the system 200 of FIG. 2. The operation of the system 300 is similar to that of the system 200. Thus, may details of the operation of the system 300 are not repeated here only for the sake of brevity. Some differences between the systems 200 and 300, which are described in further detail below, include that in the system 300 the vector thrust module 302 includes the servomotor 308 and the motor controller 306 and the flight control module 304 includes flight control instructions 324.

The vector thrust module 302 includes a motor 305, a motor controller 306, a servomotor 308, a battery 310, a coil controller 312, an electromagnetic coil 314, and channels 328, 330, 332, 334, 336, 338, 340, and 342. Each of the channels 328, 330, 332, 334, 336, 338, 340, and 342 may include one or more wires. The battery 310 supplies power to the coil controller 312 through the channel 340. The battery 310 may also provide power to the motor 305, the motor controller 306, the servomotor 308, and/or combinations thereof. The motor controller 306 drives operation of the motor 305. For example, the motor controller 306 may receive control instructions that identify operational settings associated with the motor 305. The motor controller 306 may directly control the motor 305 based on the control instructions and/or may generate further instruction for execution by the motor controller 306 based on the control instructions. In some examples, the motor controller 306 utilizes an Electronic Speed Controller (ESC) to control a speed of the motor the motor 305. The servomotor 308 may be utilized to control movement of a mount to which the motor 305 is attached (e.g., for controlling a thrust vector of the motor). Some examples include a second servomotor for controlling movement of a tail surface of an aircraft. The channel 342 couples the electromagnetic coil 314 and the coil controller 312 and is operable to bidirectionally transmit data and power between the two. The channels 328 and 330 facilitate transfer of data between the motor 305 and the motor controller 306. The channel 330 can deliver telemetry data from the motor 305 the motor controller 306. The channel 328 can deliver control instructions from the motor controller 306 to the motor 305. The channels 332 and 334 facilitate transfer of data between the motor controller 306 and the coil controller 312. The channel 332 can deliver telemetry data from the motor controller 306 to the coil controller 312. For example, the motor controller 306 may relay the telemetry data received from the motor 305 via the channel 330. The channel 334 can deliver control instructions from the coil controller 312 to the motor controller 306. The control instructions may be executed by the motor controller 306, e.g., to drive operation of the motor 305. The channels 336 and 338 facilitate transfer of data between the servomotor 308 and the coil controller 312. The channel 338 can deliver telemetry data from the servomotor 308 to the coil controller 312. The channel 336 can deliver control instructions from the coil controller 312 to the servomotor 308. The coil controller 312 controls the electromagnetic coil 212 to facilitate the power and data transfer with the flight control module 304. The coil controller 312 can wirelessly transmit the power 350 and the telemetry data 346 to the flight control module 304 and can wirelessly receive the control instructions 348 from the flight control module 304 via the electromagnetic coil 212. It is noted that the telemetry data 346 may include data from and/or associated with the motor 305, the motor controller 306, the servomotor 308, and/or combinations thereof. Likewise, the control instructions 348 may include instructions for execution by the motor 305, the motor controller 306, the servomotor 308, and/or combinations thereof.

The flight control module (FCM) 304 includes a flight control computer (FCC) 326, a coil controller 318, an electromagnetic coil 316, and channels 352, 354, 356, and 358. Each of the channels 352, 354, 356, and 358 may include one or more wires. The FCC 326 includes a processor 320, a memory 322, and flight control instructions 324. The processor 320 executes the flight control instructions 324 to process data, which may be accessed from the memory 322. For example, the processor 320 may process the telemetry data 346 from the vector thrust module 302 to generate the control instructions 348 for updating the operating characteristics of the motor controller 306. The telemetry data 346 may include data from sensors associated with the motor 305 and/or the servomotor 308. The motor controller 306 operates the motor 305. The control instructions 348 may be used directly or indirectly to control the motor 305. In some examples, the control instructions 348 when executed by the motor controller 306, the motor 305, and/or the servomotor 308 control the speed, and/or direction of the aircraft on which the system 300 is located. The memory 322 may store data received from the coil controller 318 and/or data that has been processed by the processor 320 based on the flight control instructions 324.

The motor 305 generates vibrations during operation. However, the flight control computer 326 of the flight control module 304 is sensitive to the vibrations. For example, a performance of the flight control computer 326 decreases based on the vibrations reaching the flight control computer 326. Advantageously, an air gap 344 separates the vector thrust module 302 and the flight control module 304 to isolate the flight control computer 326 from the vibrations of the motor controller 306. The air gap 344 inhibits the vibrations from passing from the motor 305 to the flight control computer 326 while the vector thrust module 302 and the flight control module 304 wireless transfer power and data between one another.

Figure 4:
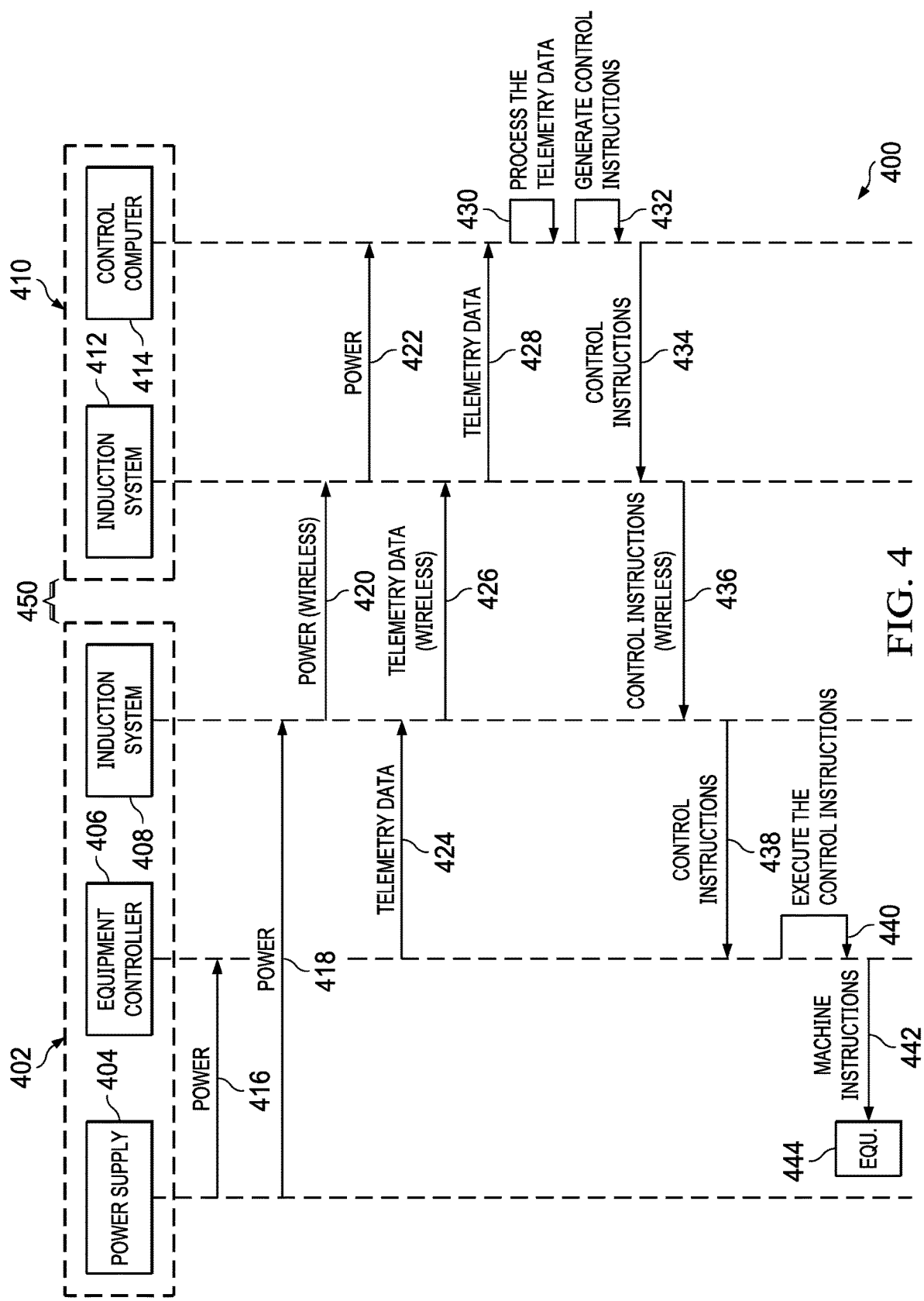
FIG. 4 is a simplified communication diagram for wireless data and/or power transmission between modular components of an aircraft, in accordance with some embodiments of the present disclosure.

FIG. 4 is a simplified communication diagram for wireless data and power transmission between modular components. The FIG. 4 illustrates a system 400 including a vibration-producing module 402 and a controller module 410. The vibration-producing module 402 includes a housing (represented as a dashed line) enclosing a power supply 404, equipment controller 406, and an induction system 408. The controller module 410 includes a housing (represented as a dashed line) enclosing an induction system 412 and a control computer 414. Each of the induction systems 408 and 412 includes at least one coil for wirelessly transferring power and/or data between the modules 402 and 410. The vibration-producing module 402 includes at least one element that produces vibrations that may negatively impact the performance of the controller module 410. An air gap 450 separates the vibration-producing module 402 and the controller module 410 to isolate the control computer 414 from the vibrations of the controller module 410. The air gap inhibits the vibrations from passing from the vibration-producing module 402 to the controller module 410 while the vibration-producing module 402 and the controller module 410 wirelessly transfer power and data between one another.

In some examples, the vibration-producing module 402 and the controller module 410 may communicate, e.g., as described below. At 416, the power supply 404 transmits power to the equipment controller 406. The equipment controller 406 receives the power and utilizes the power for its ongoing operation. At 418, the power supply 404 transmits power to the induction system 408. The induction system 408 receives the power and utilizes the power for its ongoing operation. At 420, the induction system 408 wirelessly transmits the power to the induction system 412 over the air gap 450. The induction system 412 wirelessly receives the power over the air gap 450. At 422, the induction system 412 transmits the power to the control computer 414. The control computer 414 receives the power and utilizes the power for its operation. At 424, the equipment controller 406 transmits telemetry data to the induction system 408. The induction system 408 receives the telemetry data. At 426, the induction system 408 wirelessly transmits the telemetry data to the induction system 412 over the air gap 450. The induction system 412 wirelessly receives the telemetry data over the air gap 450. At 428, the induction system 412 transmits the telemetry data to the control computer 414. The control computer 414 receives the telemetry data and, at 430, processes the telemetry data. At 432, the control computer 414 generates control instructions, e.g., based on the telemetry data. The control instructions may include a function to be performed by aircraft equipment 444. At 434, the control computer 414 transmits the control instructions to the induction system 412. The induction system 412 receives the control instructions. At 436, the induction system 412 wirelessly transmits the control instructions to the induction system 408 over the air gap 450. The induction system 408 wirelessly receives the control instructions over the air gap 450. At 438, the induction system 408 transmits the control instructions to the equipment controller 406. The equipment controller 406 receives the control instructions. At 440, the equipment controller 406 executes the control instructions, which causes it to generate machine instructions for controlling operation of aircraft equipment 444 such as including instructions to perform the function generated at 432. At 442, the equipment controller 406 transmits the machine instructions to the aircraft equipment 444. The aircraft equipment 444 executes the machine instructions to perform the function.

In some embodiments, the vibration-producing module 402 corresponds to the module 202 and the controller module 410 corresponds to the module 204 of system 200. In other embodiments, the vibration-producing module 402 corresponds to the module 302 and the controller module 410 corresponds to the module 304 of system 300.

Figure 5A:
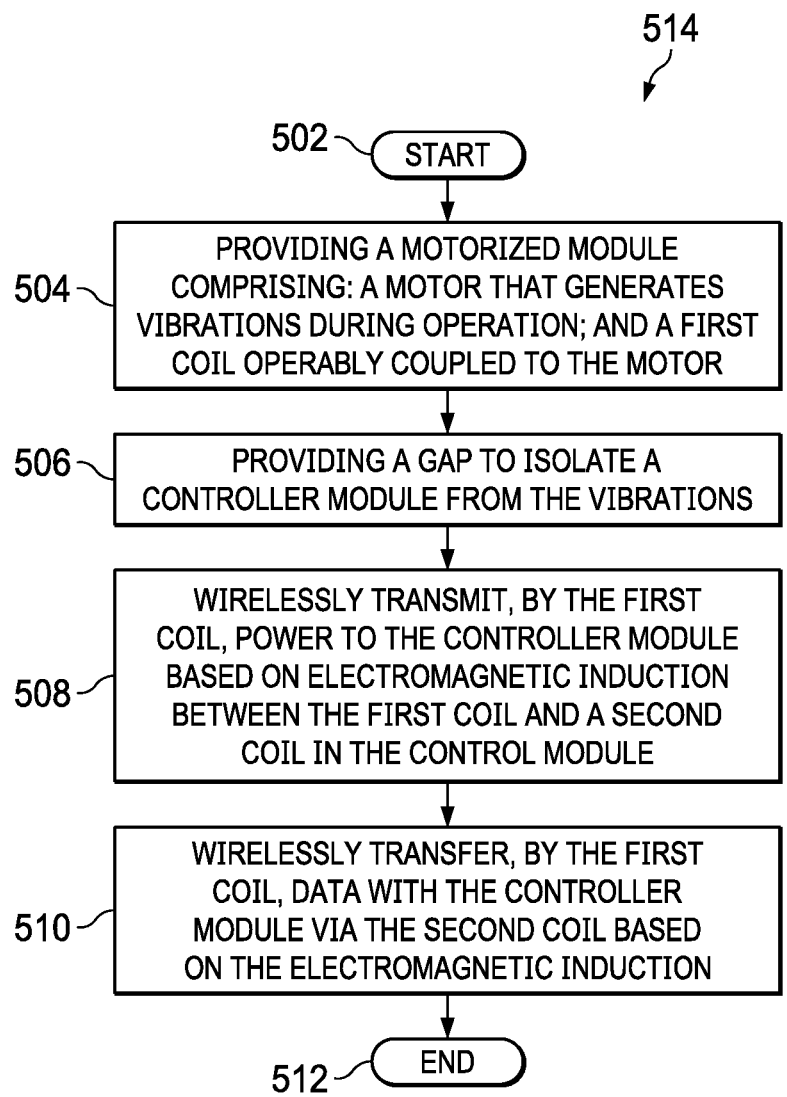
FIGS. 5A and 5B illustrate methods of transferring data and/or power between modular components of an aircraft, in accordance with some embodiments of the present disclosure.

FIG. 5A illustrates a method 514 of transferring data and/or transmitting power for a motorized module. The method 514 initiates at 502 and advances to 504 where the motorized module is provided. The motorized module comprises a motor and a first coil operably coupled to the motor. The motor generates vibrations during operation. At 506, a gap is provided to isolate a control module from the vibrations. At 508, the first coil wirelessly transmits power to the control module based on electromagnetic induction between the first coil and a second coil in the control module. The power is transmitted over the gap. At 510, the first coil wirelessly transfers data with the control module via the second coil based on the electromagnetic induction. For example, the data may be transferred bidirectionally between the first coil and the second coil over the gap. The method 514 may terminate at 512, which may coincide with a start/end point of other methods, logic, routines, and/or applications.

Figure 5B:
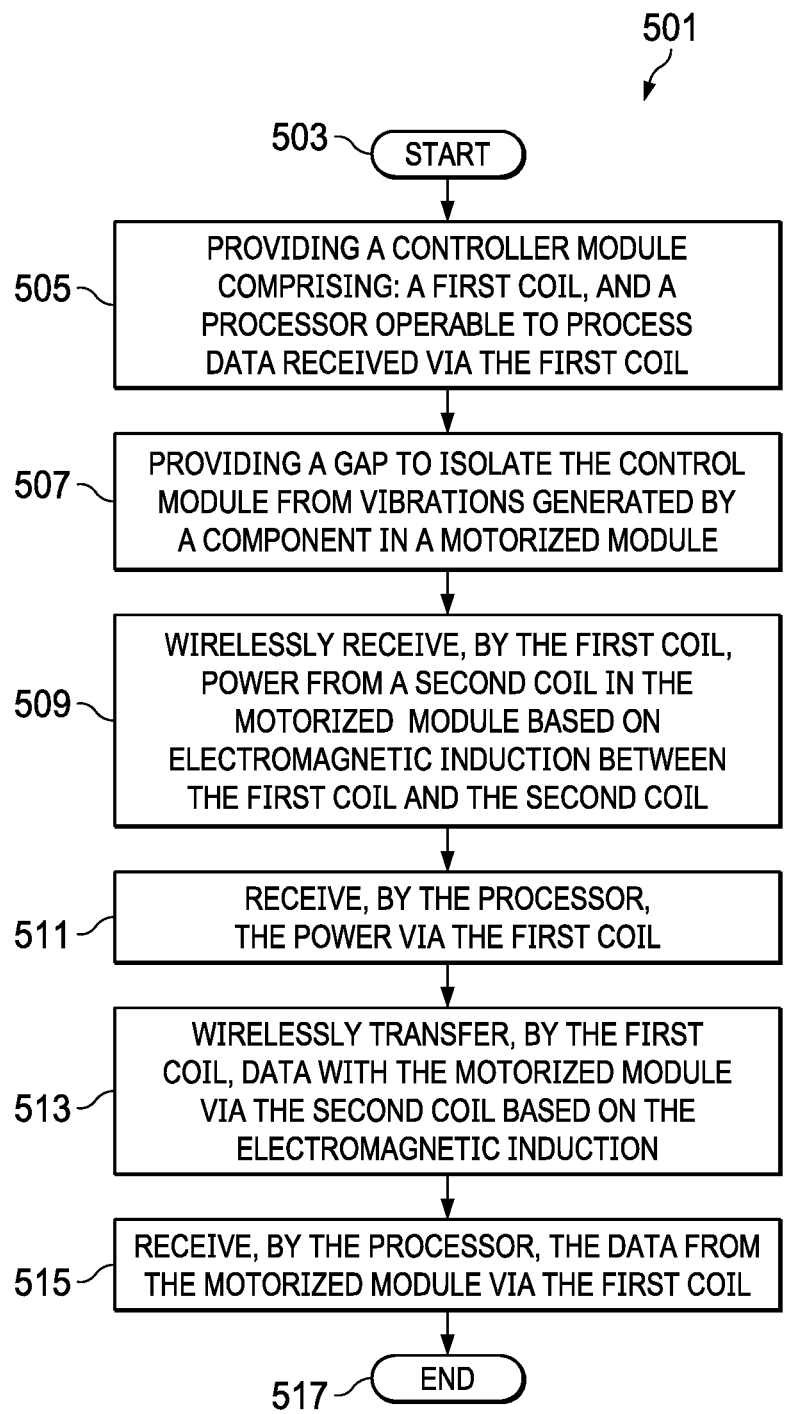

FIG. 5B illustrates a method 501 of transferring data and/or receiving power for a controller module. The method 514 initiates at 503 and advances to 505 where the controller module is provided. The controller module comprises a first coil and a processor operable to process data received via the first coil. At 507, a gap provided to isolate the control module from vibrations generated by a component in a motorized module. At 509, the first coil wirelessly receives power from a second coil in the motorized module based on electromagnetic induction between the first coil and the second coil. The power is received over the gap. At 511, the processor receives the power via the first coil. At 513, the first coil wirelessly transfers data with the motorized module via the second coil based on the electromagnetic induction. For example, the data may be transferred bidirectionally between the first coil and the second coil over the gap. At 515, the processor receives the data from the motorized module via the first coil. The method 501 may terminate at 517, which may coincide with a start/end point of other methods, logic, routines, and/or applications.

The methods 514 and 501 may be executed, whether in whole or in part, in a component or combination of components of the aircraft 100 and/or the systems, 200, 300, 400, or 500. The methods 514 and 501 may be executed simultaneously by a motorized module and controller module. In further examples, the logic may be provisioned in whole or in part in a component that is a combination the aircraft 100.

Figure 6:
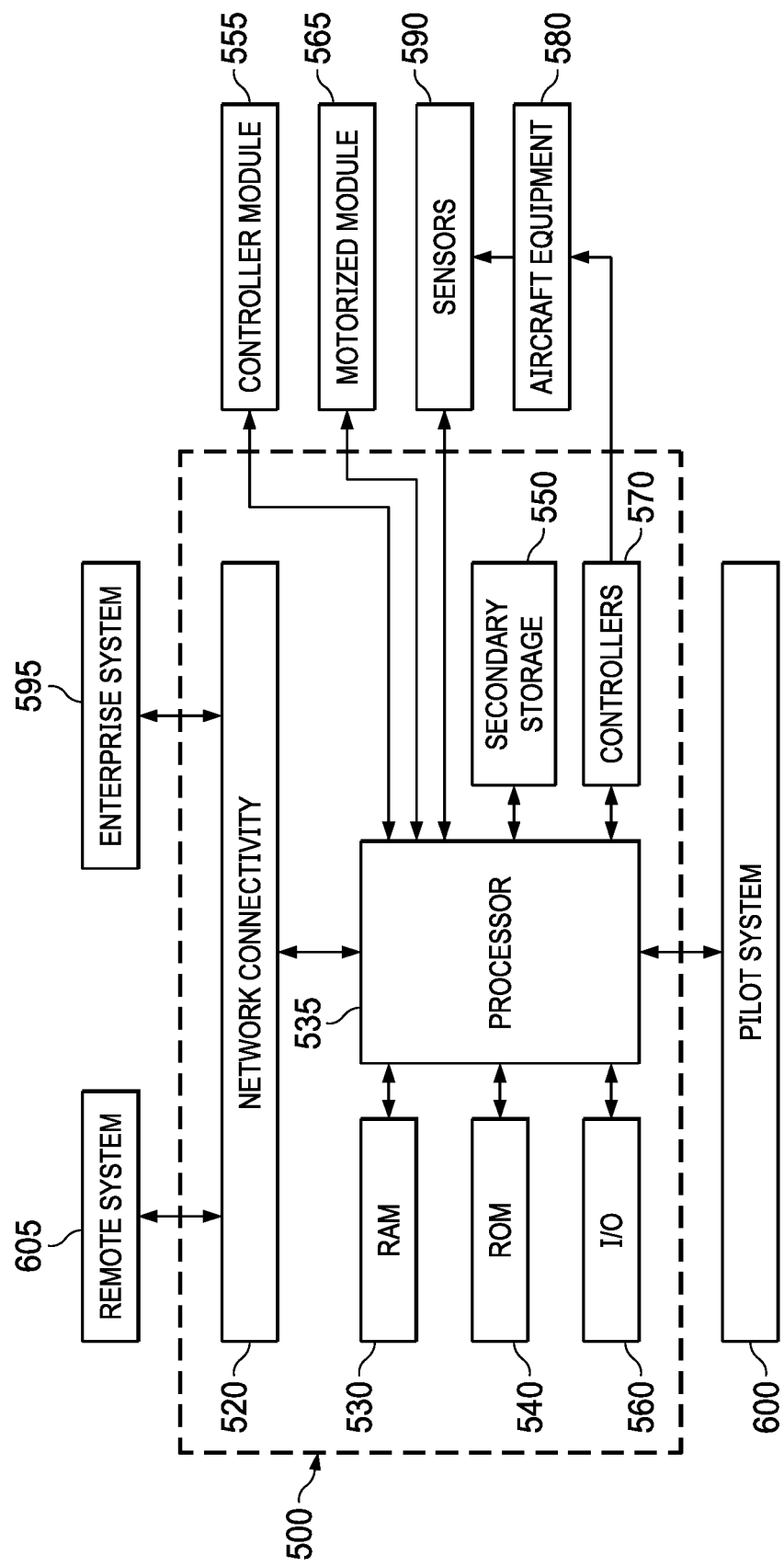
FIG. 6 is a schematic diagram of a processor system suitable for implementing some embodiments of the present disclosure.

Referring to FIG. 6, a schematic diagram of a processor (e.g. electronic controller or computer) system 500 suitable for implementing the embodiments of this disclosure is shown. System 500 includes a processing component 535 suitable for implementing one or more embodiments disclosed herein. In particular, controller module 120 of aircraft 100 configured to control operation of the propulsion assemblies 115, and/or other electronic systems of aircraft 100 disclosed herein may comprise one or more systems 500. In addition to the processor 535 (which may be referred to as a central processor unit or CPU), the system 500 may include network connectivity devices 520, random access memory ("RAM") 530, read only memory ("ROM") 540, secondary storage 550, and input/output (I/O) devices 560. System 500 may also comprise aircraft component controllers 570 for generating control signals to aircraft equipment 580 (e.g., propulsion assemblies 115 and/or control assemblies including control surfaces) in accordance with the teachings of embodiments described herein. Sensors 590 (e.g., sensors 116, 118, 119) are also provided and provide sensor data to be processed by processor 535. Motorized module 565 (e.g., 202, 302, 402) and controller module 555

(e.g., 204, 304, 410) may be coupled to one another and/or coupled to the system 500. In some cases, some of these components may not be present or may be combined in various combinations with one another or with other components not shown. These components might be located in a single physical entity or in more than one physical entity. Any actions described herein as being taken by the processor 535 might be taken by the processor 535 alone or by the processor 535 in conjunction with one or more components shown or not shown in the system 500. It will be appreciated that the data and lookup tables described herein may be stored in memory (e.g., RAM 530, ROM 540) and/or in one or more databases comprising secondary storage 550.

The processor 535 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 535 is shown, multiple processors may be present. Thus, while instructions may be discussed as being executed by processor 535, the instructions may be executed simultaneously, serially, or otherwise by one or multiple processors 535. The processor 535 may be implemented as one or more CPU chips and/or application specific integrated chips (ASICs).

The network connectivity devices 520 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 520 may enable the processor 535 to communicate with the Internet or one or more telecommunications networks or other networks from which the processor 535 might receive information or to which the processor 535 might output information.

The network connectivity devices 520 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 535 or instructions that are to be executed by processor 535. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100. The baseband signal, the signal embedded in the carrier wave, or other types of signals currently used or hereafter developed may be referred to as the transmission medium and may be generated according to several methods well known to one skilled in the art. In one embodiment, network connectivity devices 520 may be used to communicate with an enterprise system 595.

In a particular embodiment, enterprise system 595 may include one or more databases for storing data communicated to the enterprise system, as well as modules for accessing and/or processing the data and I/O devices for interacting with and/or displaying the pre- or post-processed data. Such data may include an ID number, telemetry data, and/or control instructions and the like. The data may also identify a type of the aircraft and procedures for controlling aircraft equipment which may take telemetry data as input and generate control instructions as output. This information may be leveraged later for later aircraft so that the information can be provided. Enterprise system 595 may also receive sensor data from sensors 590, which may be stored in one or more databases comprising enterprise system.

The RAM 530 might be used to store volatile data and perhaps to store instructions that are executed by the processor 535. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives, tape drives, or solid-state drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors 590 (e.g., sensors 116, 118, 119 of aircraft 100), servomotors, servomechanisms, motor drive electronics, or other well-known input or output devices, such a cyclic control, collective control, and pedal inputs used by a pilot, co-pilot, or remote pilot. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the control systems (e.g., controller module 120 of aircraft 100) and/or other electronic systems disclosed herein. Further, inputs provided through an I/O device 560, such as controller module 120, may communicate with aircraft component controls 570. Feedback via aircraft equipment 580 and/or sensors 590 (e.g., sensors 116, 118, 119, and/or other aircraft system sensors) may further communicate through one or more of the network connectivity devices 520 to provide feedback to control aircraft 100 and its associated systems.

It is to be understood by those skilled in the art that system 500 may be implemented in a variety of forms including hardware, software, firmware, special purpose processors and combinations thereof, and may comprise an autonomous flight system. System 500 may receive input from a variety of sources including on-board sources such as sensors 590 and a pilot system 600 as well as external sources such as a remote system 605, global positioning system satellites or other location positioning systems and the like. For example, system 500 may receive a flight plan including starting and ending locations for a mission from pilot system 600 and/or remote system 605. Thereafter system 500 is operable to autonomously control all aspects of flight of an aircraft of the present disclosure.

For example, during the various operating modes of aircraft 100 including vertical takeoff and landing mode, hover flight mode, forward flight mode, and transitions therebetween, commands are provided to controllers 570, which enable independent operation of each propulsion assembly 115 including, for example, controlling the rotational speed of the rotors, changing the pitch of the rotor blades, adjusting the thrust vectors and the like. In addition, these commands enable transition of aircraft 100 between the vertical lift orientation and the forward thrust orientation. Feedback may be received from controllers 570 and each propulsion assembly 115. This feedback is processed by processor 535 and can be used to supply correction data and other information to controllers 570. Sensors 590, such as positioning sensors, attitude sensors, speed sensors, environmental sensors, fuel sensors, temperature sensors, location sensors and the like, also provide information to further enhance autonomous control capabilities.

Some or all of the autonomous control capability of system 500 can be augmented or supplanted by a remote flight control system, such as remote system 605. Remote system 605 may include one or computing systems that may be implemented on general-purpose computers, special purpose computers or other machines with memory and processing capability. For example, the computing systems may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 605 may communicate with the system 500 via network connectivity devices using include both wired and wireless connections.

Remote system 605 may include one or more flight data display devices configured to display information relating to one or more aircraft of the present disclosure. Display devices may be configured in any suitable form, including, for example, liquid crystal displays, light emitting diode displays, cathode ray tube displays or any suitable type of display. Remote system 605 may also include audio output and input devices such as a microphone, speakers and/or an audio port allowing an operator to communicate with, for example, a pilot on board the aircraft 100. The display device may also serve as a remote input device if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 600. Pilot system 600 may be integrated with system 500 or may be a standalone system including a non-transitory computer readable storage medium including a set of computer instructions executable by a processor and may be implemented by a general-purpose computer, a special purpose computer or other machine with memory and processing capability. Pilot system 600 may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. Pilot system 600 may be a microprocessor-based system operable to execute program code in the form of machine-executable instructions. In addition, pilot system 600 may be connectable to other computer systems via a proprietary encrypted network, a public encrypted network, the Internet or other suitable communication network that may include both wired and wireless connections. Pilot system 600 may communicate with system 500 via a communication channel that may include a wired connection.

Pilot system 600 may include a cockpit display device configured to display information to an onboard pilot. Cockpit display device may be configured in any suitable form, including, for example, as one or more display screens such as liquid crystal displays, light emitting diode displays and the like or any other suitable display type including, for example, a display panel, a dashboard display, an augmented reality display or the like. Pilot system 600 may also include audio output and input devices such as a microphone, speakers and/or an audio port allowing an onboard pilot to communicate with, for example, air traffic control or an operator of a remote system. Cockpit display device may also serve as a pilot input device if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 500, an aircraft of the present disclosure can be operated responsive to a flight control protocol including autonomous flight control, remote flight control or onboard pilot flight control and combinations thereof.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An aircraft comprising:
   a motorized module comprising:
     a motor to operate equipment onboard the aircraft, wherein the motor generates vibrations during operation; and
     a first coil operable to:
       wirelessly transmit power to a separate module onboard the aircraft based on electromagnetic induction between the first coil and a second coil in a separate module,
       wirelessly transfer data with the separate module via the second coil based on the electromagnetic induction, the data being associated with the motor; and
   a gap separating the motorized module and the separate module, wherein the gap isolates the separate module from the vibrations.

2. The aircraft of claim 1, wherein the motorized module further comprises a power source to supply, via one or more wires, power to the motor and the first coil.

3. The aircraft of claim 1, wherein the wireless transfer of the data comprises the first coil being operable to:
   wirelessly transmit telemetry data to the separate module via the second coil; and
   wirelessly receive control instructions from the separate module via the second coil, wherein the motor is to operate the equipment based on the control instructions.

4. The aircraft of claim 1, further comprising a housing enclosing the first coil, and the gap is measured between the housing and a separate housing enclosing the second coil.

5. The aircraft of claim 1, wherein a processor in the separate module decreases in performance based on receiving the vibrations.

6. The aircraft of claim 1, wherein the aircraft comprises a vertical take-off and landing vehicle and/or an unmanned aerial vehicle.

7. An aircraft comprising:
   a controller module comprising:
     a first coil operable to:
       wirelessly receive power from a second coil in a separate module onboard the aircraft based on electromagnetic induction between the first coil and the second coil,
       wirelessly transfer data with the separate module via the second coil based on the electromagnetic induction, the data being associated with a component in the separate module; and
     a processor operable to:
       receive the power via the first coil, and
       receive the data from the separate module via the first coil;
   a gap separating the controller module and the separate module, wherein the gap isolates the controller module from vibrations generated by the component in the separate module.

8. The aircraft of claim 7, wherein the wireless transfer of the data comprises the first coil being operable to:
   wirelessly receive telemetry data from the separate module via the second coil; and
   wirelessly transmit control instructions to the separate module via the second coil, wherein the component operable based on the control instructions.

9. The aircraft of claim 8, wherein the processor is operable to generate the control instructions based on the telemetry data.

10. The aircraft of claim 7, wherein the processor decreases in performance based on receiving the vibrations.

11. The aircraft of claim 7, further comprising a housing enclosing the first coil, and the gap is measured between the housing and a separate housing enclosing the second coil.

12. The aircraft of claim 7, wherein the aircraft comprises a vertical take-off and landing vehicle and/or an unmanned aerial vehicle.

13. An aircraft comprising:
    a motorized module comprising:
      a motor to operate equipment onboard the aircraft, wherein the motor generates vibrations during operation; and
      a first coil operably coupled to the motor;
    a controller module comprising:
      a second coil;
      a processor operable to process data received via the second coil;

a gap separating the motorized module and the controller module, wherein the gap isolates the controller module from the vibrations generated by the motor in the motorized module;

wherein, based on electromagnetic induction between the first coil and the second coil, the first coil and the second coil are operable to:
  wirelessly transmit power from the motorized module to the controller module,
  wirelessly transfer the data between the motorized module and the controller module based on the electromagnetic induction.

14. The aircraft of claim 13, wherein the motorized module further comprises a power source to supply, via one or more wires, power to the motor and the first coil.

15. The aircraft of claim 13, wherein the wireless transfer of the data comprises the first coil being operable to:
  wirelessly transmit telemetry data to the controller module via the second coil; and
  wirelessly receive control instructions from the controller module via the second coil.

16. The aircraft of claim 15, wherein the processor is operable to generate the control instructions based on the telemetry data.

17. The aircraft of claim 15, wherein the wireless transfer of the data comprises the second coil being operable to:
  wirelessly receive telemetry data from the motorized module via the first coil; and
  wirelessly transmit control instructions to the motorized module via the first coil.

18. The aircraft of claim 15, wherein the motor is to operate the equipment based on the control instructions.

19. The aircraft of claim 1, further comprising:
  a first housing enclosing the first coil, and
  a second housing enclosing the second coil, wherein the gap is measured between the first housing and the second housing.

20. The aircraft of claim 1, wherein the aircraft comprises a vertical take-off and landing vehicle and/or an unmanned aerial vehicle.

* * * * *